(12) United States Patent
Gopalakrishnan et al.

(10) Patent No.: US 8,742,615 B2
(45) Date of Patent: Jun. 3, 2014

(54) METHOD AND APPARATUS FOR ELECTRIC POWER MANAGEMENT IN A VEHICLE

(75) Inventors: Suresh Gopalakrishnan, Farmington Hills, MI (US); Chandra S. Namuduri, Troy, MI (US); Mark C. Hoinka, Southfield, MI (US); Sanjeev M. Naik, Troy, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 768 days.

(21) Appl. No.: 13/006,542

(22) Filed: Jan. 14, 2011

(65) Prior Publication Data
US 2012/0181854 A1  Jul. 19, 2012

(51) Int. Cl.
*B60L 1/00* (2006.01)
(52) U.S. Cl.
USPC .......................................................... 307/9.1
(58) Field of Classification Search
USPC .................................... 307/9, 1, 10.1; 701/22
See application file for complete search history.

(56) References Cited

U.S. PATENT DOCUMENTS

| | | | |
|---|---|---|---|
| 6,522,960 B2 | 2/2003 | Nada | |
| 6,677,725 B2 | 1/2004 | Tamai et al. | |
| 6,788,027 B2 * | 9/2004 | Malik | 320/134 |
| 6,864,663 B2 | 3/2005 | Komiyama et al. | |
| 6,979,977 B2 | 12/2005 | Amano et al. | |
| 7,030,511 B2 | 4/2006 | Zarei | |
| 7,199,551 B2 | 4/2007 | Gauthier et al. | |
| 7,258,183 B2 | 8/2007 | Leonardi et al. | |
| 7,489,101 B2 | 2/2009 | Bockelmann et al. | |
| 8,417,400 B2 * | 4/2013 | Toth | 701/22 |
| 2006/0247829 A1 * | 11/2006 | Sato | 701/22 |
| 2007/0194747 A1 | 8/2007 | Alvarez et al. | |
| 2009/0045780 A1 | 2/2009 | Bergkoetter et al. | |
| 2009/0131215 A1 | 5/2009 | Shamoto | |
| 2009/0260903 A1 | 10/2009 | Park | |
| 2012/0136534 A1 * | 5/2012 | Walsh et al. | 701/36 |

FOREIGN PATENT DOCUMENTS

CN        101207331 A     6/2008

OTHER PUBLICATIONS

Erickson, R.W.;DC-DC Power Converters; Wiley Encyclopedia of Electrical and Electronics Engineering; Publ. Date: Unknown.
Bell, B.;Introduction to Push-Pull and Cascaded Power Converter Topologies; National Semiconductor; Jul. 10, 2003.

* cited by examiner

*Primary Examiner* — Daniel Cavallari

(57) ABSTRACT

An on-vehicle DC/DC converter transforms high-voltage electric power originating from an on-vehicle high-voltage source to low-voltage electric power at a regulated voltage level. The low-voltage electric power is distributed by a low-voltage bus. A method for operating the DC/DC converter includes monitoring a state of charge and a temperature of a low-voltage battery connected to the low-voltage bus, setting a DC/DC converter command to a nominal voltage level as a function of the state of charge and temperature of the low-voltage battery, monitoring a total low-voltage electric load, and adjusting the DC/DC converter command to a minimum low-voltage reference voltage when the vehicle is operating below a predetermined speed and the total low-voltage electric load is greater than a predetermined load.

13 Claims, 2 Drawing Sheets

METHOD AND APPARATUS FOR ELECTRIC POWER MANAGEMENT IN A VEHICLE

TECHNICAL FIELD

This disclosure is related to electric power management.

BACKGROUND

The statements in this section merely provide background information related to the present disclosure and may not constitute prior art.

Vehicle systems including electric and hybrid powertrain systems employ electric power systems using high-voltage and low-voltage energy systems to provide power. Known high-voltage systems include electric machines that are configured to generate tractive torque and reactive driveline torque to generate electric power. Known low-voltage systems include electric machines that are configured to provide power to accessories, e.g., headlamps, air conditioning compressors, and electric power steering devices. Known electric power systems include DC/DC power converters configured to convert high-voltage electric power to low-voltage electric power. Known DC/DC power converters for vehicle systems include high-voltage electric power inputs, for example 330 Vdc, with output power regulated at a reference voltage level commanded at or near 42 Vdc and 12 Vdc. Known electric power systems include low-voltage batteries having nominal voltage outputs of 12 Vdc. Reference voltage levels are predetermined voltage levels that are selected as a function of state of charge and a temperature of a low-voltage battery. Known systems limit an allowable range for a reference voltage level when headlamps are operating. Low-voltage electric power draws and electric power surges in excess of predetermined thresholds can cause either one or both of headlamp flickering and automatic shutdown of a DC/DC converter to protect equipment.

SUMMARY

An on-vehicle DC/DC converter transforms high-voltage electric power originating from an on-vehicle high-voltage source to low-voltage electric power at a regulated voltage level. The low-voltage electric power is distributed by a low-voltage bus. A method for operating the DC/DC converter includes monitoring a state of charge and a temperature of a low-voltage battery connected to the low-voltage bus, setting a DC/DC converter command to a nominal voltage level as a function of the state of charge and temperature of the low-voltage battery, monitoring a total low-voltage electric load, and adjusting the DC/DC converter command to a minimum low-voltage reference voltage when the vehicle is operating below a predetermined speed and the total low-voltage electric load is greater than a predetermined load.

BRIEF DESCRIPTION OF THE DRAWINGS

One or more embodiments will now be described, by way of example, with reference to the accompanying drawings, in which.

DETAILED DESCRIPTION

Figure 1:
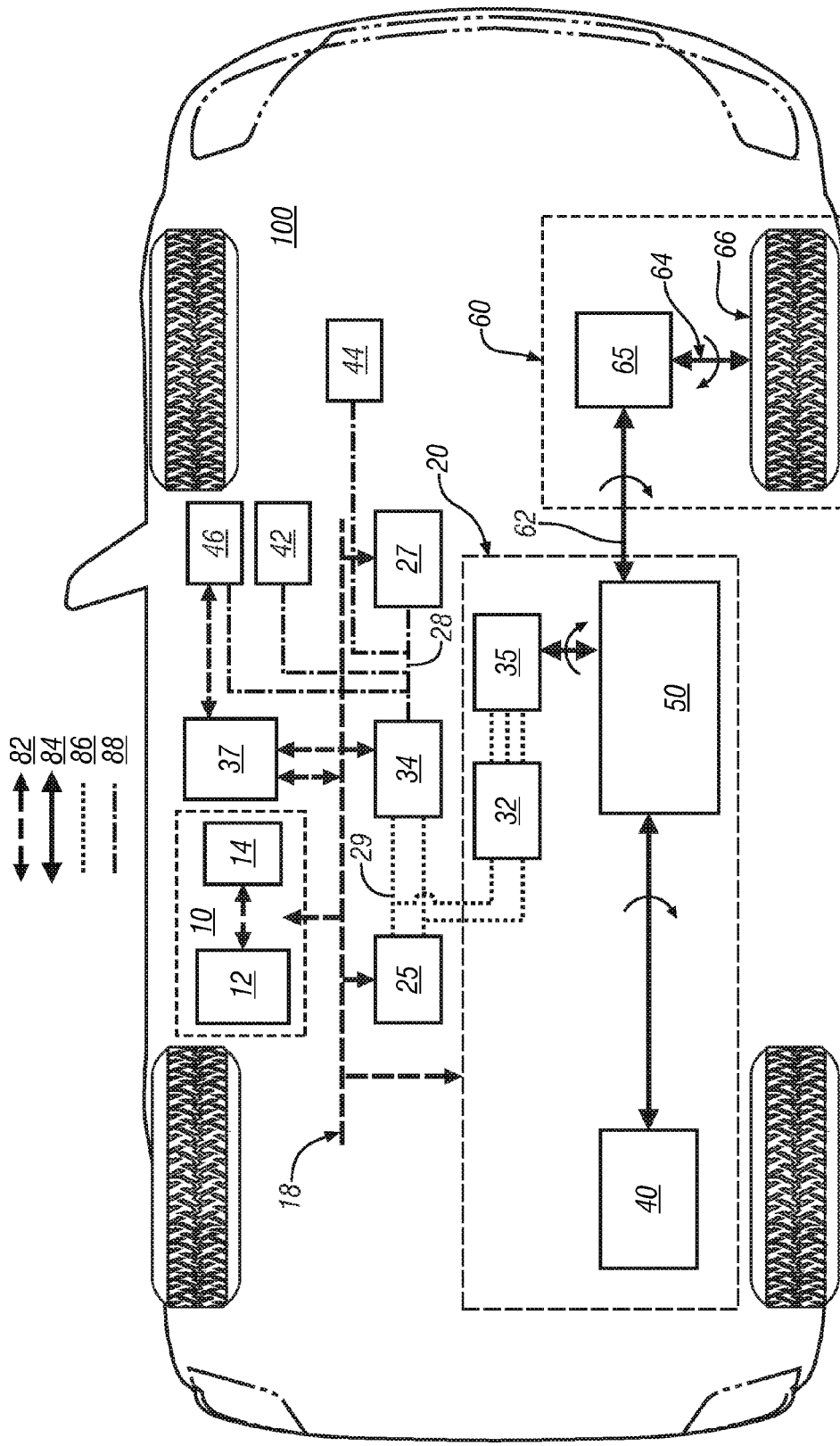
FIG. 1 is a schematic depiction of a vehicle system including a DC/DC converter configured to transform high-voltage electric power originating from an on-vehicle high-voltage source to low-voltage electric power at a regulated voltage level, in accordance with the disclosure.

Referring now to the drawings, wherein the showings are for the purpose of illustrating certain exemplary embodiments only and not for the purpose of limiting the same, FIG. 1 schematically shows a vehicle 100 including a hybrid powertrain system 20 coupled to a driveline 60 and controlled by a control system 10. Like numerals refer to like elements throughout the description. The hybrid powertrain system 20 includes a mechanical power path that includes an engine 40 and an electrically-powered torque machine (MG A) 35 that mechanically couples to a hybrid transmission 50 having an output member 62 that couples to the driveline 60. The mechanical power path for torque transfer between the elements of the hybrid powertrain system 20 is depicted using line elements 84. Signal and command communications between the elements of the hybrid powertrain system 20 is depicted using line elements 82, which includes a communications bus 18. Electric power transfer includes high-voltage electric power connections 86 including a high-voltage bus 29 and low-voltage electric power connections 88 including a low-voltage bus 28. An electrical circuit includes a high-voltage battery (HV) 25 that electrically connects to an inverter (IMA) 32 and a DC/DC converter (DC/DC) 34 via the high-voltage bus 29. The DC/DC converter 34 electrically connects to the low-voltage bus 28 and a low-voltage battery 27.

Exemplary hybrid powertrain system 20 includes the engine 40 as a multi-cylinder internal combustion engine that converts fuel to mechanical power through a combustion process. The engine 40 is equipped with a plurality of actuators and sensing devices for monitoring operation and delivering fuel to form a combustion charge to produce torque that is responsive to an operator torque request. The torque machine 35 is preferably a multi-phase electric motor/generator configured to convert stored electric energy to mechanical power and convert mechanical power to electric energy that can be stored in the high-voltage battery 25. The transmission 50 preferably includes one or more differential gear sets and activatable clutch components to effect torque transfer over a range of speeds between the engine 40, the torque machine 35, and the output member 62. The driveline 60 can include a differential gear device 65 that mechanically couples to an axle 64 or half-shaft that mechanically couples to a wheel 66 in one embodiment. The driveline 60 transfers tractive power between the hybrid transmission 50 and a road surface. It is appreciated that the hybrid powertrain system 20 is illustrative.

The control system 10 includes a control module 12 that is signally connected to an operator interface 14. The control module 12 preferably signally and operatively connects to individual elements of the hybrid powertrain system 20 either directly or via the communications bus 18. The control module 12 signally connects to the sensing devices of each of the high-voltage battery 25, the inverter module 32, the torque machine 35, the engine 40, and the hybrid transmission 50 to monitor operation and determine parametric states thereof. One monitored parametric state is vehicle speed (Vss). The vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), a steering wheel, and a headlamp switch. It is appreciated that the headlamp switch may be replaced by an automated system for activating and deactivating headlamps. Although the control module 12 and operator interface 14 are shown as individual discrete elements, such an illustration is for ease of description. It is appreciated that the functions described as being performed by the control module 12 may be combined into one or more devices, e.g., implemented in software, hardware, and/or application-specific integrated circuitry (ASIC) and ancillary controllers and circuits that are separate and distinct from the control module 12. One of the ancillary controllers is controller 37, which is described herein with reference to a low-voltage electrical circuit. It is appreciated that information transfer to and from the control module 12 and controller 37 can be accomplished using one or more communications paths, e.g., communications bus 18, which can include one or more of a direct connection, a local area network bus, and a serial peripheral interface bus.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. Control modules may have a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The high-voltage battery 25 stores potential electric energy and is electrically connected via the high-voltage bus 29 to the inverter 32 that connects to the torque machine 35 to transfer electric power therebetween. It is appreciated that the high-voltage battery 25 is an electric energy storage device that can include a plurality of electrical cells, ultracapacitors, and other devices configured to store electric energy on-vehicle. One exemplary high-voltage battery 25 includes a plurality of lithium-ion cells. Parametric states associated with the high-voltage battery 25 include a state-of-charge, temperature, available voltage, and available battery power, each of which is monitored by the control system 10. In one embodiment the available voltage provided from the high-voltage battery 25 to the high-voltage bus 29 is in a range between 270 Vdc and 390 Vdc. The available battery power describes battery power limits that include an allowable range between a minimum and maximum allowable battery power, described as a maximum charge power (Pbat-Max Charge) and a maximum discharge power (Pbat-Max Discharge). It is appreciated that the battery power is measured in terms of a parameter that can be regularly monitored, e.g., the state-of-charge (SOC) or another suitable parameter. The allowable battery power limits are preferably established at threshold levels to prevent either overcharging or overdischarging of the high-voltage battery 25, which can result in damage that reduces service life thereof.

The low-voltage electric circuit includes the DC/DC converter 34 electrically connected to the low-voltage bus 28 to provide electric power in response to a total low-voltage electric load. The total on-vehicle low-voltage electric load corresponds to passive low-voltage electric load(s) 42, an active low-voltage load 44, a controllable low-voltage electric load 46, and a charge load for the low-voltage battery 27, each of which electrically connects to the low-voltage bus 28. The controller 37 signally and operatively connects to the DC/DC converter 34 and operatively connects to device(s) associated with the controllable low-voltage electric load 46. The passive low-voltage electric load(s) 42 include on-vehicle electric power accessories that make electric power demands on the low-voltage bus 28 and are not actively controlled by the controller 37, and may include, e.g., headlamps, HVAC components, infotainment devices, and other systems. The device(s) associated with the controllable low-voltage electric load 46 includes one or more on-vehicle low-voltage electrical load devices that can be activated to draw electric power and deactivated by the controller 37, including, e.g., an electric rear-window defogger, an electric windshield de-icer, and a heating device for a passenger seat. The controllable low-voltage electric load 46 may also include an electrical resistance device. The active low-voltage electric load 44 includes on-vehicle hardware configurations that may operate in a regenerative mode to generate electric current that is transferred to the low-voltage bus 28 under specific operating circumstances. One illustrative active low-voltage electric load 44 electrically connected to the low-voltage bus 28 includes an electric power steering system (EPS), which includes one or more low-voltage electric motors configured to provide mechanical power for manipulating steerable vehicle wheels in response to an operator input to a steering wheel. An exemplary electric power steering system draws less than three amps of current under most vehicle operating conditions. Under vehicle conditions including steering at low or zero speeds such as during a parking maneuver, an electric power steering system may transiently draw over 100 amps of current. The electric power steering system (EPS) is considered an active low-voltage electric load 44 because electric power can be generated when there is springback motion of the steerable wheels through the hardware components of the electric power steering system during a steering maneuver. The electric power generated by the springback motion is transferred to the low-voltage bus 28, thus providing a voltage boost and generating voltage spikes on the low-voltage bus 28.

The low-voltage battery 27 stores potential electric energy and is electrically connected via the low-voltage bus 28 to the DC/DC converter 34 to transfer electric power therebetween. It is appreciated that the low-voltage battery 27 is an electric energy storage device that can include a lead-acid battery in one embodiment. Parametric states associated with the low-voltage battery 25 include a state-of-charge and temperature, which are monitored by the controller 37. In one embodiment the available voltage provided from the low-voltage battery 25 to the low-voltage bus 28 is in a range between 12.8 Vdc and 15.5 Vdc. Allowable battery power limits are preferably established at threshold levels to prevent either overcharging or overdischarging, which can result in damage to the low-voltage battery 25 that reduces service life thereof.

The inverter 32 electrically connects to the torque machine 35 and converts stored electric energy to mechanical power and converts mechanical power to electric energy that can be stored in the high-voltage battery 25. It is appreciated that the inverter 32 is operative to transform high-voltage DC electric power to high-voltage AC electric power and also operative to transform high-voltage AC electric power to high-voltage DC electric power.

The controller 37 signally connects to the DC/DC converter 34 to monitor electric voltage level across and current load through the low-voltage bus 28. The controller 37 operatively connects to the DC/DC converter 34 to command a low-voltage DC voltage level output from the DC/DC converter 34 in response to a DC/DC converter command (RVC) which is a regulated voltage level. In one embodiment, the controller 37 operatively connects to the controllable electric load 46 to control activation and deactivation thereof.

The DC/DC converter 34 electrically connects to the high-voltage bus 29 and operates to convert high-voltage DC electric power to low-voltage DC electric power at the regulated voltage level, thus providing low-voltage DC electric power to the low-voltage bus 28 for powering the passive low-voltage load(s) 42, the active low-voltage electric load 44, and the controllable low-voltage electric load 46 and electrically charging the low-voltage battery 27. The DC/DC converter 34 is configured to provide low-voltage electric power to the low-voltage bus 28 at the regulated voltage level in response to the DC/DC converter command (RVC) output from the controller 37. As configured, the DC/DC converter 34 supplants a low-voltage electric power generator and acts to charge the low-voltage battery 27. Details related to design and operation of a DC/DC converter 34 are known to skilled practitioners.

The regulated voltage level of the electric power output from the DC/DC converter 34 to the low-voltage bus 28 can vary between a minimum level to a maximum level, for example, between 12.8 Vdc and 15.5 Vdc, with the minimum and maximum voltage limits corresponding to limits for the low-voltage battery 25. A nominal regulated voltage level may be set as a function of the state-of-charge (SOC) of the low-voltage battery 27 and battery temperature, unless otherwise set as described herein. In one embodiment, the nominal regulated voltage level is set at 13.8 Vdc for 100% SOC over an ambient temperature range between −40° C. to greater than 50° C. The nominal regulated voltage level increases with a decrease in the SOC of the low-voltage battery 27, and decreases with an increase in the battery temperature.

The DC/DC converter 34 can be specified in terms of electric power and current limits. The DC/DC converter 34 maintains voltage to the low-voltage bus 28 at the regulated voltage level when the low-voltage bus current across the low-voltage bus 28 from the DC/DC converter 34 is less than a predetermined current limit. The current through the low-voltage bus 28 includes current loading from the passive low-voltage electric load(s) 42, the active low-voltage electric load 44 and the controllable low-voltage electric load 46, and a charging current for the low-voltage battery 27. When the current limit for the DC/DC converter 34 is exceeded, the DC/DC converter 34 operates to fold back the voltage across the low-voltage bus 28 to maintain power output from the DC/DC converter 34 to the low-voltage bus 28 at the electric power limit, causing a decrease or dip on the low-voltage bus 28 below the regulated voltage level. The DC/DC converter 34 folds back the voltage across the low-voltage bus 28 until the low-voltage battery 27 is able to share the low-voltage electric load current.

The DC/DC converter 34 may temporarily shut down or enter a standby mode in response to either one of a voltage dip and a voltage spike on the low-voltage bus 28 when the voltage level exceeds predetermined lower and upper voltage limits, resulting in an interrupt and loss of low-voltage electric power in the vehicle 100.

Figure 2:
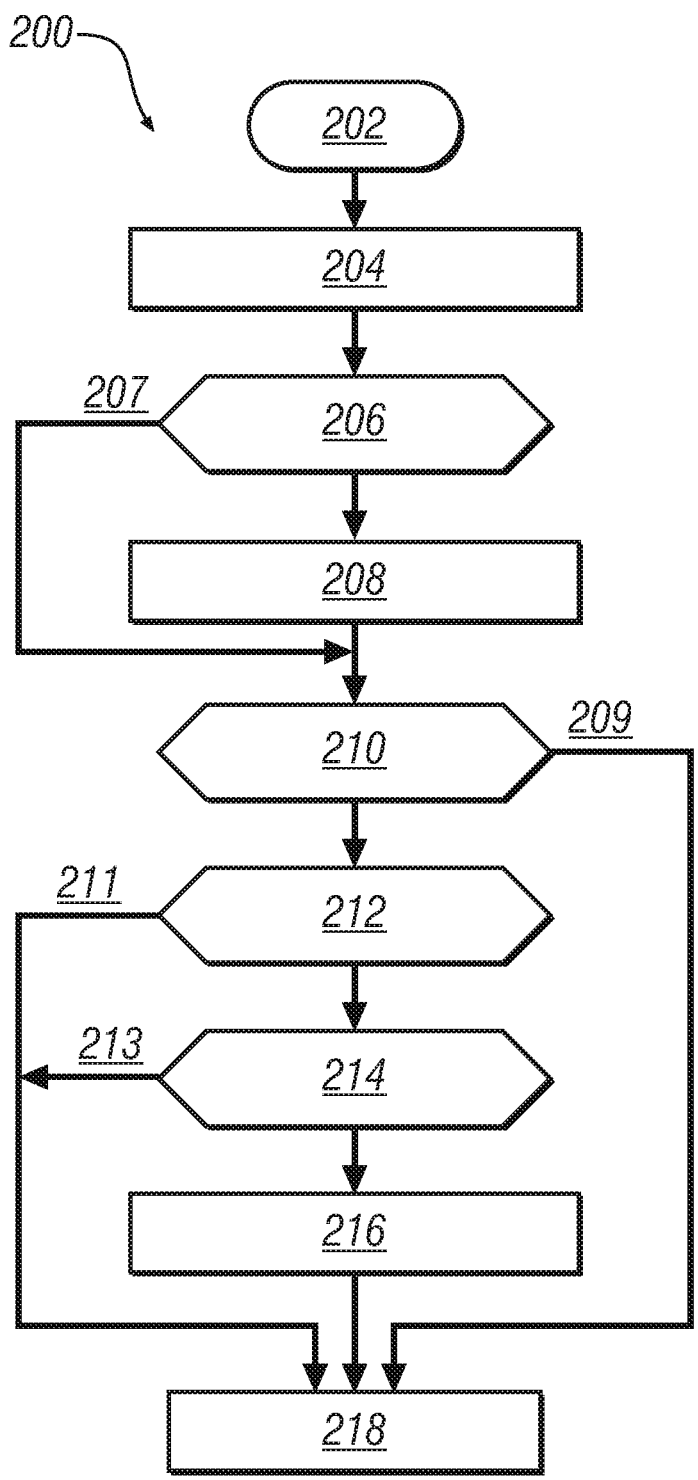
FIG. 2 is a flowchart of a control scheme for operating a DC/DC converter to a preferred regulated voltage level, in accordance with the present disclosure.

FIG. 2 schematically shows a control scheme 200 in the form of a flowchart for operating a DC/DC converter to a preferred regulated voltage level to minimize the likelihood of a voltage dip associated with an excess electric power demand on the low-voltage bus. Minimizing the likelihood of a voltage dip associated with an excess electric power demand on the low-voltage bus may minimize perceivable headlamp flicker and other conditions affecting operator satisfaction.

The control scheme 200 is described with reference to the vehicle 100 including the DC/DC converter 34 and the low-voltage bus 28. It is appreciated that the control scheme 200 may be applied to other operating systems and is not limited to the embodiment described with reference to FIG. 1. The on-vehicle DC/DC converter 34 is configured to transform high-voltage electric power originating from the high-voltage battery 25 to low-voltage electric power at a regulated voltage level with the low-voltage electric power distributed by the low-voltage bus 28. The control scheme includes monitoring a state of charge (SOC) and a temperature (Temperature) of the low-voltage battery 27 (202). The DC/DC converter command (RVC) is set a nominal voltage level corresponding to the state of charge and temperature of the low-voltage battery (204). Other monitored states include the total on-vehicle low-voltage electric load including the passive low-voltage electric load(s) 42, the active low-voltage load 44, the controllable low-voltage electric load 46, and the charge load for the low-voltage battery 27, each of which electrically connects to the low-voltage bus 28. It is determined whether the vehicle 100 is operating in a fuel economy mode (FE Mode) (206). If so, the DC/DC converter command (RVC) is reset to a minimum allowable level, in one embodiment 12.8 Vdc (208). If not, the DC/DC converter command (RVC) is not reset (207). It is then determined whether the headlamps or another high-power low-voltage load(s) is activated (210). Such high-power low-voltage loads may be predetermined ones or combinations of the vehicle low-voltage loads. When no high-power low-voltage load(s) is activated (209), the regulated voltage level is set as described and used to control operation of the DC/DC converter 34 (218).

When the headlamps or another high-power low-voltage load(s) is activated, it is next determined whether the vehicle speed is less than a low speed threshold, e.g., less than 8 kph (5 mph) (212). The low speed threshold for vehicle speed is intended to indicate conditions wherein vehicle speed is close to zero, or wherein static steering may occur. When the vehicle speed is greater than the low speed threshold (211), the DC/DC converter command is set as described and used to control operation of the DC/DC converter 34 (218).

When the vehicle speed is less than the low speed threshold, it is determined whether the total on-vehicle low-voltage electric load is greater than a load threshold for the DC/DC converter 34 (214). When the total on-vehicle low-voltage electric load is less than a high load threshold for the DC/DC converter 34 (213), the DC/DC converter command is set as described and used to control operation of the DC/DC converter 34 (218).

When the total on-vehicle low-voltage electric load is greater than the high load threshold for the DC/DC converter 34, the DC/DC converter command is selected as a lowest permissible value for the regulated voltage level that is associated with the SOC of the low-voltage battery 27 (RVC=Min RVC(SOC) (216), and the DC/DC converter command is set as described and used to control operation of the DC/DC converter 34 (218). The lowest permissible value for the DC/DC converter command is determined based upon capacity of the low-voltage battery 27 and operating conditions of other devices powered by the low-voltage bus 28, and in one embodiment is 13.5 Vdc. Thus, the electric current output from the DC/DC converter 34 is maximized under the specifically defined circumstances prior to allowing a fold back of the voltage level from the regulated voltage level. Additionally, one or more controllable low-voltage electric load may be selectively disabled or shed when the total on-vehicle low-voltage electric load is greater than the high load threshold for the DC/DC converter 34.

Other operating conditions can lead to temporarily shutting down the DC/DC converter 34 or controlling the DC/DC converter 34 in a standby mode in response to a voltage spike on the low-voltage bus 28 when the voltage level exceeds predetermined upper voltage limits. Such an operating condition has been previously described with reference to the active low-voltage load 44, e.g., electric power steering which may operate in a regenerative mode to generate electric current that is transferred to the low-voltage bus 28.

In order to minimize the likelihood of occurrence of a voltage spike on the low-voltage bus 28 and associated temporary shutdown of the DC/DC converter 34 or to control the DC/DC converter 34 in a standby mode, a second control scheme monitors the voltage across the low-voltage bus 28. When the monitored voltage level across the low-voltage bus exceeds a first threshold, one or several of the controllable low-voltage electric load(s) 46 is activated, preferably for a predetermined period of time in order to consume electric current on the low-voltage bus 28. The electric current on the low-voltage bus 28 consumed in and thus dissipated by the controllable low-voltage electric load(s) 46 is that electric power load associated with operating the active low-voltage load 44 in a regenerative mode to generate electric current that is transferred to the low-voltage bus 28 in an attempt to prevent the voltage on the low-voltage bus 28 from exceeding an upper voltage threshold. When the voltage across the low-voltage bus 28 exceeds the upper voltage threshold, the DC/DC converter 34 is commanded to enter a standby mode. The DC/DC converter 34 is reactivated subsequent to entering the standby mode only when the voltage level across the low-voltage bus 28 is less than a lower threshold. Preferably the first threshold is less than the upper threshold. Preferably the lower threshold is less than the upper threshold, allowing for hysteresis in the operating system. In one embodiment, the lower threshold is 16.0 Vdc and the upper threshold is 16.5 Vdc. Preferably the first threshold is the less than the lower threshold in order to minimize cycling of the controllable low-voltage electric load 46.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an on-vehicle DC/DC converter configured to transform high-voltage electric power originating from an on-vehicle high-voltage source to low-voltage electric power at a regulated voltage level, the low-voltage electric power distributed by a low-voltage bus, the method comprising:
   monitoring a state of charge and a temperature of a low-voltage battery connected to the low-voltage bus;
   setting a DC/DC converter command to a nominal voltage level as a function of the state of charge and temperature of the low-voltage battery;
   monitoring a total low-voltage electric load; and
   adjusting the DC/DC converter command to a minimum low-voltage reference voltage when the vehicle is operating below a predetermined speed and the total low-voltage electric load is greater than a predetermined load.

2. The method of claim 1, wherein adjusting the DC/DC converter command comprises adjusting the DC/DC converter command to the minimum low-voltage reference voltage is effected only when the total low-voltage electric load comprises a vehicle headlamp.

3. The method of claim 2, further comprising selectively disabling at least one low-voltage electric load when the total low-voltage electric load is greater than the predetermined load.

4. The method of claim 1, further comprising:
   monitoring a voltage across the low-voltage bus; and
   activating at least one low-voltage electric load when the monitored voltage across the low-voltage bus exceeds a predetermined first voltage.

5. The method of claim 4, further comprising deactivating the DC/DC converter subsequent to activating said at least one low-voltage electric load when the voltage across the low-voltage bus exceeds a predetermined second voltage greater than the predetermined first voltage.

6. The method of claim 5, further comprising reactivating the DC/DC converter subsequent to deactivating the DC/DC converter when the voltage level across the low-voltage bus is less than a predetermined third voltage less than the predetermined second voltage.

7. Method for operating an on-vehicle DC/DC converter configured to transform high-voltage electric power originating from an on-vehicle high-voltage source to low-voltage electric power at a regulated voltage level, the low-voltage electric power distributed by a low-voltage bus, the method comprising:
   monitoring a state of charge and a temperature of a low-voltage battery connected to the low-voltage bus;
   setting a DC/DC converter command to a nominal voltage level as a function of the state of charge and temperature of the low-voltage battery;
   monitoring a low-voltage electric load comprising a vehicle headlamp; and
   adjusting the DC/DC converter command to a minimum low-voltage reference voltage when the vehicle is operating below a predetermined speed and the total low-voltage electric load is greater than a predetermined load;
   monitoring a voltage across the low-voltage bus; and
   activating at least one low-voltage electric load when the monitored voltage across the low-voltage bus exceeds a predetermined first voltage.

8. The method of claim 7, further comprising deactivating the DC/DC converter subsequent to activating said at least one low-voltage electric load when the voltage across the low-voltage bus exceeds a predetermined second voltage greater than the predetermined first voltage.

9. The method of claim 8, further comprising reactivating the DC/DC converter subsequent to deactivating the DC/DC converter when the voltage level across the low-voltage bus is less than a predetermined third voltage less than the predetermined second voltage.

10. The method of claim 7, wherein activation of said at least one low-voltage electric load is for a predetermined duration.

11. Method for operating an on-vehicle DC/DC converter configured to transform high-voltage electric power originating from an on-vehicle high-voltage source to low-voltage electric power at a regulated voltage level, the low-voltage electric power distributed by a low-voltage bus, the method comprising:

monitoring a state of charge and a temperature of a low-voltage battery connected to the low-voltage bus;

setting a DC/DC converter command to a nominal voltage level as a function of the state of charge and temperature of the low-voltage battery;

monitoring a total low-voltage electric load including a passive low-voltage electric load, an active low-voltage load, a controllable low-voltage electric load, and a charge load for the low-voltage battery;

monitoring a voltage across the low-voltage bus; and activating the controllable low-voltage electric load when the monitored voltage across the low-voltage bus exceeds a first voltage.

12. The method of claim 11, further comprising deactivating the DC/DC converter when the voltage across the low-voltage bus exceeds a predetermined second voltage subsequent to activating the controllable low-voltage electric load.

13. The method of claim 12, further comprising reactivating the DC/DC converter subsequent to deactivating the DC/DC converter when the voltage level across the low-voltage bus is less than a predetermined third voltage less than the predetermined second voltage.

\* \* \* \* \*